US012606444B2

(12) United States Patent
Ito et al.

(10) Patent No.: US 12,606,444 B2
(45) Date of Patent: Apr. 21, 2026

(54) METHOD FOR MANUFACTURING SILICA SOL

(71) Applicant: FUJIMI INCORPORATED, Kiyosu (JP)

(72) Inventors: Masaaki Ito, Kiyosu (JP); Jun Shinoda, Kiyosu (JP); Keiji Ashitaka, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 1 day.

(21) Appl. No.: 18/595,187

(22) Filed: Mar. 4, 2024

(65) Prior Publication Data

US 2024/0199432 A1     Jun. 20, 2024

Related U.S. Application Data

(63) Continuation of application No. 16/818,148, filed on Mar. 13, 2020, now abandoned.

(30) Foreign Application Priority Data

Mar. 28, 2019     (JP) ................................. 2019-064631

(51) Int. Cl.
| | |
|---|---|
| *C01B 33/148* | (2006.01) |
| *C01B 33/14* | (2006.01) |
| *C01B 33/141* | (2006.01) |
| *C01B 33/145* | (2006.01) |

(52) U.S. Cl.
CPC .......... *C01B 33/148* (2013.01); *C01B 33/141* (2013.01); *C01B 33/145* (2013.01); *C01B*

*33/14* (2013.01); *C01P 2004/64* (2013.01); *C01P 2006/22* (2013.01)

(58) Field of Classification Search
None
See application file for complete search history.

(56) References Cited

U.S. PATENT DOCUMENTS

| | | | |
|---|---|---|---|
| 2005/0218241 A1 | 10/2005 | Matsuura et al. | |
| 2005/0223890 A1 | 10/2005 | Matsuura | |
| 2013/0012657 A1 | 1/2013 | Yoshikawa | |

(Continued)

FOREIGN PATENT DOCUMENTS

| | | |
|---|---|---|
| CN | 202342918 U | 7/2012 |
| CN | 107848811 A | 3/2018 |
| JP | 19-88143901 | 6/1988 |

(Continued)

OTHER PUBLICATIONS

Jung et al ("Filtration of dispersed nanoparticles using cyclone and ultrasonic atomization", J of Accoustical Society of Korea, vol. 41 , No. 1 (2022), pp. 9-15) (Year: 2022).*

*Primary Examiner* — Michael Forrest
(74) *Attorney, Agent, or Firm* — Foley & Lardner LLP

(57)     ABSTRACT

A method for manufacturing a silica sol according to an embodiment of the present invention includes: a step of preparing a silica sol reaction liquid by hydrolyzing and polycondensing an alkoxysilane or a condensate thereof using an alkali catalyst in a solvent; and at least one of a step of concentrating the silica sol reaction liquid by an ultrasonic atomization separation method and a step of replacing the silica sol reaction liquid with water by the ultrasonic atomization separation method.

12 Claims, 2 Drawing Sheets

100

(56) References Cited

U.S. PATENT DOCUMENTS

| | | |
|---|---|---|
| 2015/0151213 A1 | 6/2015 | Namba et al. |
| 2019/0010059 A1 | 1/2019 | Ashitaka et al. |

FOREIGN PATENT DOCUMENTS

| | | |
|---|---|---|
| JP | S63-143901 A | 6/1988 |
| JP | H01-278413 A | 11/1989 |
| JP | 2005-060219 A | 3/2005 |
| JP | 2013-014489 A | 1/2013 |
| WO | WO-2017/022552 A1 | 2/2017 |

* cited by examiner

100

200

METHOD FOR MANUFACTURING SILICA SOL

CROSS-REFERENCE TO RELATED APPLICATIONS

This application is a continuation of U.S. patent application Ser. No. 16/818,148, filed Mar. 13, 2020, which claims priority to Japanese Patent Application No. 2019-064631, filed on Mar. 28, 2019, the contents of each of which are incorporated herein in their entirety.

BACKGROUND

1. Technical Field

The present invention relates to a method for manufacturing a silica sol.

2. Description of Related Arts

Conventionally, as a method for manufacturing a silica sol, a manufacturing method using a sodium silicate solution called water glass as a starting material is known. In this manufacturing method, the sodium silicate solution is treated once with a cation exchange resin, and sodium ions and other ions are removed to increase a purity as a starting material. Thereafter, the resulting product is used for manufacturing a silica sol.

However, in such a manufacturing method as described above, there is a limit for obtaining a starting material with high purity by ion exchange.

Therefore, as a method for obtaining high purity silica sol, JP 2005-60219 A discloses a method for manufacturing a silica sol, including: (a) a first step of manufacturing a silica sol by hydrolyzing and polycondensing a hydrolyzable silicon compound; and (b) a second step of concentrating the silica sol obtained in the first step at a certain silica concentration or less according to a particle size and replacing a dispersing medium and an alkali catalyst in the silica sol with water to adjust the pH from 6.0 to 9.0.

SUMMARY

However, the technique described in JP 2005-60219 A has a problem that aggregation of silica particles and an increase in the viscosity of the silica sol are caused, it is difficult to increase the concentration of the silica sol, and the economic efficiency of the silica sol is reduced.

Therefore, an object of the present invention is to provide a means capable of suppressing or preventing aggregation of silica particles and an increase in the viscosity of a silica sol.

The present inventors made intensive studies in order to solve the above problem. As a result, the present inventors have found that the above problem can be solved by a method for manufacturing a silica sol, including: a step of preparing a silica sol reaction liquid by hydrolyzing and polycondensing an alkoxysilane or a condensate thereof using an alkali catalyst in a solvent; and at least one of a step of concentrating the silica sol reaction liquid by an ultrasonic atomization separation method and a step of replacing the silica sol reaction liquid with water by the ultrasonic atomization separation method.

DETAILED DESCRIPTION

Figure 1:
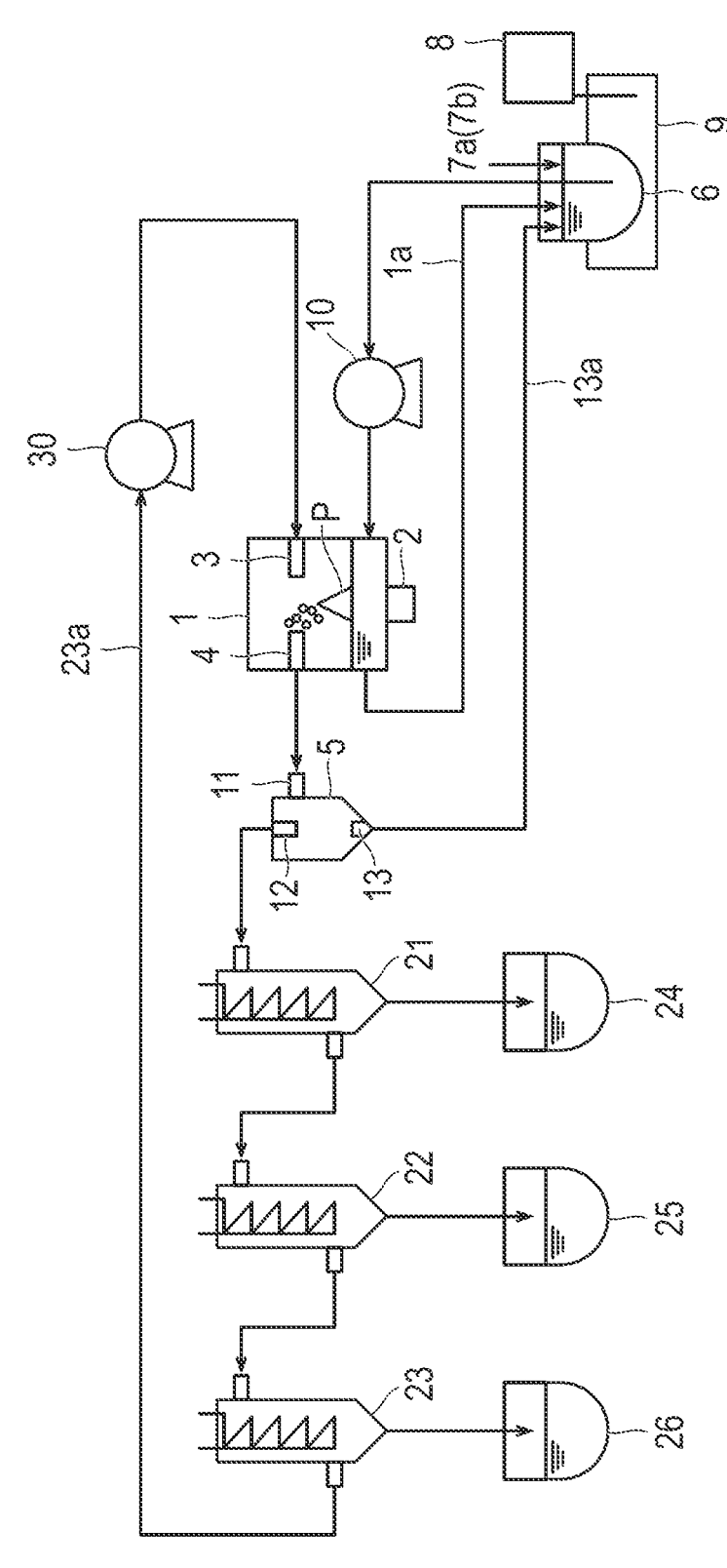
FIG. 1 is a schematic diagram illustrating an example of an ultrasonic atomization separation apparatus, in which reference numeral 1 denotes an ultrasonic atomization chamber, reference numeral 1a denotes a circulation line, reference numeral 2 denotes an ultrasonic vibrator, reference numeral 3 denotes a blowing nozzle, reference numeral 4 denotes a nozzle, reference numeral 5 denotes a cyclone, reference numeral 6 denotes a reaction liquid tank, reference numeral 7a denotes a silica sol reaction liquid, reference numeral 7b denotes water, reference numeral 8 denotes a heater, reference numeral 9 denotes a bath, reference numeral 10 denotes a pump, reference numeral 11 denotes an inlet, reference numeral 12 denotes an upper outlet, reference numeral 13 denotes a lower outlet, reference numerals 13a and 23a each denote a line, reference numeral 21 denotes a first cooling/recovery tower, reference numeral 22 denotes a second cooling/recovery tower, reference numeral 23 denotes a third cooling/recovery tower, reference numerals 24, 25 and 26 each denote a recovery liquid tank, reference numeral 30 denotes a gas pressurizer, reference numeral 100 denotes an ultrasonic atomization separation apparatus, and reference numeral P denotes a liquid pillar.

Hereinafter, an embodiment of the present invention will be described. Note that the present invention is not limited only to the following embodiment. Furthermore, in the present specification, unless otherwise specified, an operation or measurement of physical properties and the like is performed under conditions of room temperature (20° C. or higher and 25° C. or lower)/relative humidity of 40% RH or more and 50% RH or less.

A method for manufacturing a silica sol according to an embodiment of the present invention includes: a step of preparing a silica sol reaction liquid by hydrolyzing and polycondensing an alkoxysilane or a condensate thereof using an alkali catalyst in a solvent; and at least one of a step of concentrating the silica sol reaction liquid by an ultrasonic atomization separation method and a step of replacing the silica sol reaction liquid with water by the ultrasonic atomization separation method.

In the technique described in JP 2005-60219 A, after a silica sol is obtained, the silica sol is concentrated and replaced with water by heating distillation. However, the present inventors have found that this technique has a problem that aggregation of silica particles and an increase in the viscosity of a silica sol are caused, it is difficult to increase the concentration of the silica sol, and the economic efficiency of the silica sol is reduced.

The present inventors made a study in order to find a cause of the above problem. As a result, the present inventors have found that an alkali catalyst having an effect of dispersing the silica particles in the silica sol was also removed by heating distillation performed in the steps of concentration and water replacement. The present inventors considered that this might cause aggregation of the silica particles and an increase in the viscosity of the silica sol.

Therefore, the present inventors further made a study. As a result, the present inventors have found that the above problem is solved by a manufacturing method including at least one of a step of concentrating a silica sol reaction liquid obtained after hydrolysis and polycondensation by an ultrasonic atomization separation method and a step of replacing an organic solvent in the silica sol reaction liquid with water by the ultrasonic atomization separation method.

In the step of concentrating a silica sol reaction liquid by an ultrasonic atomization separation method and the step of replacing an organic solvent in the silica sol reaction liquid with water by the ultrasonic atomization separation method according to an aspect of the present invention, a heating operation approximately to the boiling point of the solvent is not performed unlike conventional heating distillation. As a result, the alkali catalyst having an effect of dispersing the silica particles remains in the silica sol finally obtained. Therefore, it is possible to suppress or prevent aggregation of the silica particles in the silica sol finally obtained and an increase in the viscosity of the silica sol, to easily increase the concentration of the silica sol, and to improve the economic efficiency of the silica sol.

However, the above mechanism is only based on estimation, and the present invention is not in any way limited to the mechanism.

[Step of Preparing Silica Sol Reaction Liquid]

A manufacturing method according to an embodiment of the present invention includes a step of preparing a silica sol reaction liquid by hydrolyzing and polycondensing an alkoxysilane or a condensate thereof using an alkali catalyst in a solvent. This method is not particularly limited, and examples thereof include:

(1) a method for adding a liquid containing an alkoxysilane and an organic solvent to a liquid containing an alkali catalyst, water, and an organic solvent, and performing hydrolysis and polycondensation (two liquid reaction type);

(2) a method for mixing a liquid (A) containing an alkali catalyst, water, and a first organic solvent (in the present specification, also referred to as "liquid (A)") with a liquid (B) containing an alkoxysilane or a condensate thereof and a second organic solvent (in the present specification, also referred to as "liquid (B)") and a liquid (C1) containing water and having a pH of 5.0 or more and less than 8.0 (in the present specification, also referred to as "liquid (C1)"), and performing hydrolysis and polycondensation (three liquid reaction type);

(3) a method for mixing the liquid (A) containing an alkali catalyst, water, and the first organic solvent with the liquid (B) containing an alkoxysilane or a condensate thereof and the second organic solvent and a liquid (C2) containing water and no alkali catalyst ((in the present specification, also referred to as "liquid (C2)"), and performing hydrolysis and polycondensation (three liquid reaction type);

and the like. Among these methods, the three liquid reaction type method of (2) or (3) is preferable from a viewpoint that silica particles having a uniform particle size can be stably obtained. Therefore, hereinafter, the methods of (2) and (3) will be described in detail. Note that the method of (2) is also referred to as "method (2)", and the method of (3) is also referred to as "method (3)".

[Liquid (A) Containing Alkali Catalyst, Water, and First Organic Solvent]

The liquid (A) is common to the methods (2) and (3), and the following description is also common to the methods (2) and (3).

The liquid (A) can be prepared by mixing an alkali catalyst, water, and the first organic solvent, and can further contain another component.

As the alkali catalyst contained in the liquid (A), a conventionally known one can be used. The alkali catalyst is preferably at least one of ammonia and an ammonium salt from a viewpoint of minimizing contamination with metal impurities and the like, and more preferably ammonia from a viewpoint of excellent catalytic action. The alkali catalyst can be used singly or in mixture of two or more types thereof.

As water contained in the liquid (A), pure water or ultrapure water is preferably used from a viewpoint of minimizing contamination with metal impurities and the like.

As the first organic solvent contained in the liquid (A), a hydrophilic organic solvent is preferably used, and specific examples thereof include an alcohol such as methanol, ethanol, n-propanol, isopropanol, ethylene glycol, propylene glycol, or 1,4-butanediol; a ketone such as acetone or methyl ethyl ketone; and the like.

As the first organic solvent, an alcohol is preferable. By using an alcohol, there is an effect that the alcohol can be easily replaced with water when the silica sol reaction liquid is replaced with water. It is preferable to use the same type of alcohol as an alcohol generated by hydrolysis of an alkoxysilane from a viewpoint of recovery and reuse of an organic solvent.

Among alcohols, at least one of methanol, ethanol, isopropanol, and the like is more preferable. When tetramethoxysilane is used as an alkoxysilane, the first organic solvent is preferably methanol.

The first organic solvent can be used singly or in mixture of two or more types thereof.

The contents of the alkali catalyst, water, and the first organic solvent in the liquid (A) are not particularly limited. However, according to a desired particle size, the alkali catalyst, water, and the first organic solvent to be used can be changed, and the contents thereof can also be appropriately adjusted. In the present step, the particle size of the silica particles can be controlled by controlling the content of the alkali catalyst in the liquid (A). For example, when ammonia is used as the alkali catalyst, the lower limit of the content of ammonia is preferably 0.1% by mass or more, and more preferably 0.3% by mass or more with respect to the total amount of the liquid (A) (100% by mass) from a viewpoint of action as a hydrolysis catalyst or growth of the silica particles. Furthermore, the upper limit of the content of ammonia is not particularly limited, but is preferably 50% by mass or less, more preferably 40% by mass or less, and still more preferably 20% by mass or less from a viewpoint of productivity and cost. The lower limit of the content of water is adjusted according to the amount of an alkoxysilane or a condensate thereof used in a reaction, but is preferably 5% by mass or more, and more preferably 10% by mass or more with respect to the total amount of the liquid (A) (100% by mass) from a viewpoint of hydrolysis of the alkoxysilane. Furthermore, the upper limit of the content of water is preferably 50% by mass or less, and more preferably 40% by mass or less with respect to the total amount of the liquid (A) (100% by mass) from a viewpoint of compatibility with the liquid (B) described later. When methanol is used as the first organic solvent, the lower limit of the content of methanol is preferably 10% by mass or more, and more preferably 20% by mass or more with respect to the total amount of the liquid (A) (100% by mass) from a viewpoint of compatibility with the liquid (B). Furthermore, the upper limit of the content of methanol is preferably 98% by mass or less, and more preferably 95% by mass or less with respect to the total amount of the liquid (A) (100% by mass) from a viewpoint of dispersibility.

[Liquid (B) Containing Alkoxysilane or Condensate Thereof and Second Organic Solvent]

The liquid (B) is common to the methods (2) and (3), and the following description is also common to the methods (2) and (3).

The liquid (B) containing an alkoxysilane or a condensate thereof and the second organic solvent can be prepared by mixing an alkoxysilane or a condensate thereof with the second organic solvent. Preparation is preferably performed by dissolving an alkoxysilane or a condensate thereof in an organic solvent from a viewpoint that a too high concentration of an alkoxysilane or a condensate thereof makes a reaction violent and easily generates a gel-like substance, and miscibility.

The liquid (B) can contain, in addition to an alkoxysilane or a condensate thereof and the second organic solvent, another component as long as the effects of the present invention are not impaired.

Examples of the alkoxysilane or a condensate thereof contained in the liquid (B) include tetramethoxysilane, tetraethoxysilane, tetrapropoxysilane, and condensates thereof. These compounds can be used singly or in combination of two or more types thereof. Among these compounds, tetraethoxysilane is preferable from a viewpoint of having appropriate hydrolysis reactivity.

As the second organic solvent contained in the liquid (B), a hydrophilic organic solvent is preferably used, and specific examples thereof include an alcohol such as methanol, ethanol, n-propanol, isopropanol, ethylene glycol, propylene glycol, or 1,4-butanediol; a ketone such as acetone or methyl ethyl ketone; and the like.

As the second organic solvent, an alcohol is preferable. By using an alcohol, there is an effect that the alcohol can be easily replaced with water when the silica sol reaction liquid is replaced with water. Furthermore, it is preferable to use the same type of alcohol as an alcohol generated by hydrolysis of an alkoxysilane from a viewpoint of recovery and reuse of an organic solvent. Among alcohols, methanol, ethanol, isopropanol, and the like are more preferable. For example, when tetramethoxysilane is used as an alkoxysilane, the second organic solvent is preferably methanol. The second organic solvent can be used singly or in mixture of two or more types thereof. Furthermore, the second organic solvent contained in the liquid (B) is preferably the same as the first organic solvent contained in the liquid (A) from a viewpoint of recovery and reuse of the organic solvent.

The contents of an alkoxysilane or a condensate thereof and the second organic solvent in the liquid (B) are not particularly limited, and can be appropriately adjusted according to a desired shape, a particle size, and the like. For example, when tetramethoxysilane is used as the alkoxysilane and methanol is used as the second organic solvent, the upper limit of the content of tetramethoxysilane is preferably 98% by mass or less, and more preferably 95% by mass or less with respect to the total amount of the liquid (B) (100% by mass). Furthermore, the lower limit of the content of tetramethoxysilane is preferably 50% by mass or more, and more preferably 60% by mass or more with respect to the total amount of the liquid (B) (100% by mass). With such a content, miscibility at the time of mixing with the liquid (A) is increased, a gel-like substance is not easily generated, and a silica sol having a high concentration can be prepared.

[Liquid (C1) Containing Water and Having pH of 5.0 or More and Less than 8.0]

The liquid (C1) in the method (2) is a liquid containing water and having a pH of 5.0 or more and less than 8.0. The liquid (C1) can further contain another component in addition to water within a range that the pH is 5.0 or more and less than 8.0.

The pH of the liquid (C1) is 5.0 or more and less than 8.0. When the pH of the liquid (C1) is less than 8.0, a local increase in the concentration of hydroxide ions in a reaction liquid can be suppressed, and therefore a stable reaction can be caused. Furthermore, when the pH is 5.0 or more, gelation of the reaction liquid can be suppressed. The pH of the liquid (C1) is preferably 5.5 or more, and more preferably 6.0 or more from a viewpoint of further suppressing gelation of the reaction liquid.

Water contained in the liquid (C1) is preferably pure water or ultrapure water from a viewpoint of minimizing contamination with metal impurities and the like. Furthermore, the liquid (C1) preferably contains no alkali catalyst from a viewpoint that the obtained silica particles have a uniform size and that the concentration of the silica particles can be increased.

[Liquid (C2) Containing Water and No Alkali Catalyst]

The liquid (C2) in the method (3) contains water and no alkali catalyst. When the liquid (C2) contains no alkali catalyst, a local increase in the concentration of the alkali catalyst in the reaction liquid can be suppressed, and therefore silica particles having a uniform particle size can be obtained.

Water contained in the liquid (C2) is preferably pure water or ultrapure water from a viewpoint of minimizing contamination with metal impurities and the like.

[Step of Preparing Reaction Liquid]

In the present step, the liquid (A), the liquid (B), and the liquid (C) (in the present specification, the liquid (C) means a general concept including at least one of the liquid (C1) and the liquid (C2)) are mixed to prepare a reaction liquid. Hydrolysis and polycondensation of an alkoxysilane or a condensate thereof proceed in the reaction liquid, and a silica sol reaction liquid is thereby generated.

Note that in the present specification, the term "reaction liquid" means a liquid in a state where hydrolysis and polycondensation of an alkoxysilane or a condensate thereof are about to proceed (before proceeding). The "silica sol reaction liquid" means a liquid after hydrolysis and polycondensation are completed and before a concentration step or a water replacement step is performed. The "silica sol" means a product obtained after a concentration step or a water replacement step is performed.

When the liquid (A) is mixed with the liquid (B) and the liquid (C), a method for adding the liquid (B) and the liquid (C) is not particularly limited. The liquid (B) and the liquid (C) may be simultaneously added to the liquid (A) in such a manner that the amount of each of the liquid (B) and the liquid (C) is substantially constant, or may be alternately added to the liquid (A). Alternatively, the liquid (B) and the liquid (C) may be added at random. Among these addition methods, it is preferable to use a method for simultaneously adding the liquid (B) and the liquid (C), and more preferable to use a method for simultaneously adding the liquid (B) and the liquid (C) in such a manner that the amount of each of the liquid (B) and the liquid (C) is substantially constant from a viewpoint of suppressing a change in the amount of water used for a synthesis reaction in the reaction liquid.

Furthermore, the method for adding the liquid (B) and the liquid (C) to the liquid (A) is preferably a method for adding the liquid (B) and the liquid (C) to the liquid (A) divisionally or continuously from a viewpoint that a local increase in the concentration of the alkali catalyst in the reaction liquid can be suppressed.

The divisional addition does not mean that the total amount of the liquid (B) and the liquid (C) is added at once, but means that the liquid (B) and the liquid (C) are added in two or more portions discontinuously or continuously when the liquid (B) and the liquid (C) are added to the liquid (A). Specific examples of the divisional addition include dropping.

The continuous addition does not mean that the total amount of the liquid (B) and the liquid (C) is added at once, but means that the liquid (B) and the liquid (C) are added continuously without interrupting the addition when the liquid (B) and the liquid (C) are added to the liquid (A).

Time required for adding the total amount of the liquid (B) and the liquid (C) to the liquid (A) varies depending on the amount of the liquid (B) or the liquid (C), but for example, only needs to be 10 minutes or more, preferably 15 minutes or more, and more preferably 20 minutes or more. When the liquid (B) and the liquid (C) are added to the liquid (A), addition of the total amount in a short time without spending a certain period of time or more, or addition of the total amount of the liquid (B) and the liquid (C) to the liquid (A) at once may cause a bias in the concentration of each component in the reaction liquid. Furthermore, the upper limit of the time required for adding the total amount of the liquid (B) and the liquid (C) to the liquid (A) is not particularly limited, and can be appropriately adjusted according to a desired particle size considering productivity.

When the liquid (A) is mixed with the liquid (B) and the liquid (C), a preferable method for adding the liquid (B) and the liquid (C) is a method in which addition of the liquid (B) and the liquid (C) is completed in such a manner that the amount of each of the liquid (B) and the liquid (C) is substantially constant for a certain period of time or more from a viewpoint of making the particle size of the silica particles uniform.

The temperatures of the liquid (A), the liquid (B), and the liquid (C) when the reaction liquid is prepared are not particularly limited. Here, the temperatures of the liquid (A), the liquid (B), and the liquid (C) when the reaction liquid is prepared are the temperatures of the liquid (A), the liquid (B), and the liquid (C) when the liquid (B) and the liquid (C) are added to the liquid (A), respectively. The particle size of the silica particles can be controlled by controlling the temperature of the reaction liquid (each liquid).

The lower limit of the temperature of each liquid is preferably 0° ° C. or higher, and more preferably 10° C. or higher. Furthermore, the upper limit of the temperature of each liquid is preferably 70° ° C. or lower, more preferably 60° ° C. or lower, and still more preferably 50° ° C. or lower. When the temperature is 0° C. or higher, freezing of each liquid can be prevented. On the other hand, when the temperature is 70° ° C. or lower, volatilization of an organic solvent can be prevented.

Furthermore, the temperatures of the liquid (A), the liquid (B), and the liquid (C) may be the same or different. However, a difference among the temperatures of the liquid (A), the liquid (B), and the liquid (C) is preferably within 20° C. from a viewpoint of making the particle size of the silica particles uniform. Here, the difference in temperature means a difference between the highest temperature and the lowest temperature among the temperatures of the three liquids.

In the present step, the hydrolysis and polycondensation reaction can be performed under any pressure condition of reduced pressure, normal pressure, and increased pressure. However, the hydrolysis and polycondensation reaction are preferably performed under normal pressure from a viewpoint of production cost. As reaction temperature, reaction time, and the like, conventionally known knowledge can be appropriately adopted.

Molar ratios of an alkoxysilane or a condensate thereof, water, an alkali catalyst, and the first and second organic solvents in the reaction liquid are not particularly limited, and can be appropriately adjusted depending on the content of an alkali catalyst contained in the liquid (A) or an alkoxysilane or a condensate thereof contained in the liquid (B).

The shapes of the silica particles in the silica sol reaction liquid is not particularly limited, and may be spherical or non-spherical.

[Step of Concentrating Silica Sol Reaction Liquid by Ultrasonic Atomization Separation Method and Step of Replacing Silica Sol Reaction Liquid with Water by Ultrasonic Atomization Separation Method]

The manufacturing method according to an aspect of the present invention includes at least one of a step of concentrating the silica sol reaction liquid obtained in the above step by an ultrasonic atomization separation method (hereinafter, also simply referred to as "concentration step"), and a step of replacing the silica sol reaction liquid with water by the ultrasonic atomization separation method (hereinafter, also simply referred to as "water replacement step").

The concentration step is a step of concentrating the silica sol reaction liquid by the ultrasonic atomization separation method. The water replacement step is a step of replacing an organic solvent in the silica sol reaction liquid with water by the ultrasonic atomization separation method. In the manufacturing method according to an aspect of the present invention, at least one of these two steps is performed. In these two steps, a heating operation approximately to the boiling point of the solvent is not performed unlike conventional heating distillation. As a result, the alkali catalyst having an effect of dispersing the silica particles remains in the silica sol finally obtained. Therefore, it is possible to suppress or prevent aggregation of the silica particles in the silica sol finally obtained and an increase in the viscosity of the silica sol, to easily increase the concentration of the silica sol, and to improve the economic efficiency of the silica sol.

In the manufacturing method according to an aspect of the present invention, only the concentration step may be performed, only the water replacement step may be performed, the water replacement step of replacing an organic solvent in a liquid concentrated with water may be performed after the concentration step is performed, or the concentration step of concentrating a liquid replaced with water may be performed after the water replacement step is performed. Furthermore, the concentration step may be performed a plurality of times. In this case, the water replacement step may be performed between the concentration step and the concentration step. For example, after the concentration step, the water replacement step of replacing an organic solvent in a liquid concentrated with water may be performed, and the concentration step of concentrating the liquid replaced with water may be further performed.

<Ultrasonic Atomization Separation Method>

The ultrasonic atomization separation method used in the concentration step and the water replacement step is a method for atomizing a solution containing a solute into a mist by ultrasonic vibration, aggregating and recovering the mist, and separating a solution containing a high-concentration solute. The ultrasonic atomization separation method is performed, for example, using an ultrasonic atomization separation apparatus 100 as illustrated in FIG. 1. Hereinafter, the concentration step using the ultrasonic atomization separation method will be described with reference to FIG. 1 appropriately. Note that an ultrasonic atomization separation apparatus 200 illustrated in FIG. 2 has a similar configuration to that of FIG. 1 except that the number of cooling/recovery towers is two, and therefore will be described with reference to FIG. 1.

FIG. 1 is a schematic diagram illustrating an example of an ultrasonic atomization separation apparatus. The ultrasonic atomization separation apparatus 100 illustrated in FIG. 1 includes an ultrasonic atomization chamber 1 to which a silica sol reaction liquid is supplied, an ultrasonic vibrator 2 that atomizes a silica sol reaction liquid in the ultrasonic atomization chamber 1 into a mist by ultrasonic vibration, a blowing nozzle 3 that blows a carrier gas onto a liquid pillar P formed on liquid surface due to ultrasonic vibration by the ultrasonic vibrator 2, and a cyclone 5 that centrifugally separates a mist supplied.

When the silica sol reaction liquid in the ultrasonic atomization chamber 1 is ultrasonically vibrated, a part of the silica sol reaction liquid in the ultrasonic atomization chamber 1 is atomized as a mist from a liquid surface. In order to generate a mist efficiently, the liquid surface of the silica sol reaction liquid is ultrasonically vibrated. In order to achieve this, in the ultrasonic atomization chamber 1 illustrated in FIG. 1, the ultrasonic vibrator 2 is preferably disposed upward at a bottom of the ultrasonic atomization chamber filled with the silica sol reaction liquid. The ultrasonic vibrator 2 emits ultrasonic waves upward from the bottom toward the liquid surface, and ultrasonically vibrates the liquid surface.

The ultrasonic atomization chamber 1 illustrated in FIG. 1 includes the ultrasonic vibrator 2 and an ultrasonic power supply (not illustrated) that ultrasonically vibrates the ultrasonic vibrator 2. The ultrasonic vibrator 2 is fixed to a bottom of the ultrasonic atomization chamber 1 with a watertight structure. Only one ultrasonic vibrator 2 may be disposed, or two or more ultrasonic vibrators 2 may be disposed. The frequency of the ultrasonic vibrator 2 is not particularly limited and can be set appropriately. For example, the frequency is 1.0 MHz or more and 10.0 MHz or less.

A mist of the silica sol reaction liquid atomized in the ultrasonic atomization chamber 1 flows into the cyclone 5 via a nozzle 4 by a carrier gas emitted from the blowing nozzle 3. The mist includes, for example, an organic solvent (for example, methanol), water, an alkali catalyst (for example, ammonia), and a very small amount of silica particles. As an example of the carrier gas, an inert gas such as a helium gas, a nitrogen gas, or an argon gas, or air may be used singly, or a mixture thereof may be used. The carrier gas is supplied to the blowing nozzle 3 by a gas pressurizer 30 such as a compressor, a pressure fan, or an air pump. The flow rate of the carrier gas is not particularly limited and can be appropriately set according to the scale of an apparatus.

The carrier gas is circulated and used. However, the carrier gas is not exhausted to the outside, and therefore the silica sol reaction liquid does not leak outside. Furthermore, running cost can be reduced by using air. When air is used, air can also be used without being circulated. Examples of an apparatus that does not circulate air include an apparatus that sucks fresh air with a gas supplier and supplies the fresh air to the vicinity of the blowing nozzle 3.

The carrier gas containing a mist is supplied to the cyclone 5 that is a separator, and centrifugally separated. The cyclone 5 includes an inlet 11, a lower outlet 13 that discharges a second exhaust component that is accelerated outward by a centrifugal force and falls along an inner surface, and an upper outlet 12 that exhausts a first exhaust component collected at the center to an upper side. The cyclone 5 rotates a mist flowing in from the inlet 11 therein and centrifugally separates the mist. The mist rotated in the cyclone 5 has a different centrifugal force depending on a particle size. The centrifugal force applied to the mist is proportional to the mass of the mist. Therefore, a mist having a large particle size moves to an inner surface of the cyclone 5 under a large centrifugal force, falls along the inner surface, and is discharged from the lower outlet 13. A small mist and a gas vaporized from the mist each have a small mass, are collected at the center, and are discharged from the upper outlet 12.

When a part of the silica sol reaction liquid is atomized into a mist and the mist is supplied to the cyclone 5 by a carrier gas, most of the organic solvent and the alkali catalyst contained in the mist are discharged from the upper outlet 12, and water and a very small amount of silica particles accompanying water are discharged from the lower outlet 13 in a mist state.

As the separator, in addition to the cyclone, any other apparatus capable of separating the supplied mist mixed gas according to a particle size or mass, such as a demister, can be used. Furthermore, FIGS. 1 and 2 illustrate an apparatus having one cyclone, but two or more cyclones may be included.

Examples of a recovery unit that cools a carrier gas discharged from the upper outlet 12 of the cyclone 5 and recovers an organic solvent include a cooling/recovery tower (21, 22, 23) including a cooling heat exchanger that cools the carrier gas and aggregating the organic solvent, as illustrated in FIG. 1. The cooling heat exchanger can circulate a cooling refrigerant and cooling water through a heat exchange pipe to cool the carrier gas, and can fix fins to the heat exchange pipe to improve the efficiency of heat exchange. The cooling/recovery tower (21, 22, 23) aggregates the organic solvent contained in the carrier gas flowing therein while cooling the organic solvent with the cooling heat exchanger, and recovers the organic solvent in a recovery liquid tank (24, 25, 26). The carrier gas discharged from the cooling/recovery tower 23 is sent to an ultrasonic separation chamber 1 by the gas pressurizer 30 via a line 23*a*. The set temperature of the cooling/recovery tower only needs to be appropriately set depending on the type of a solvent used.

Figure 2:
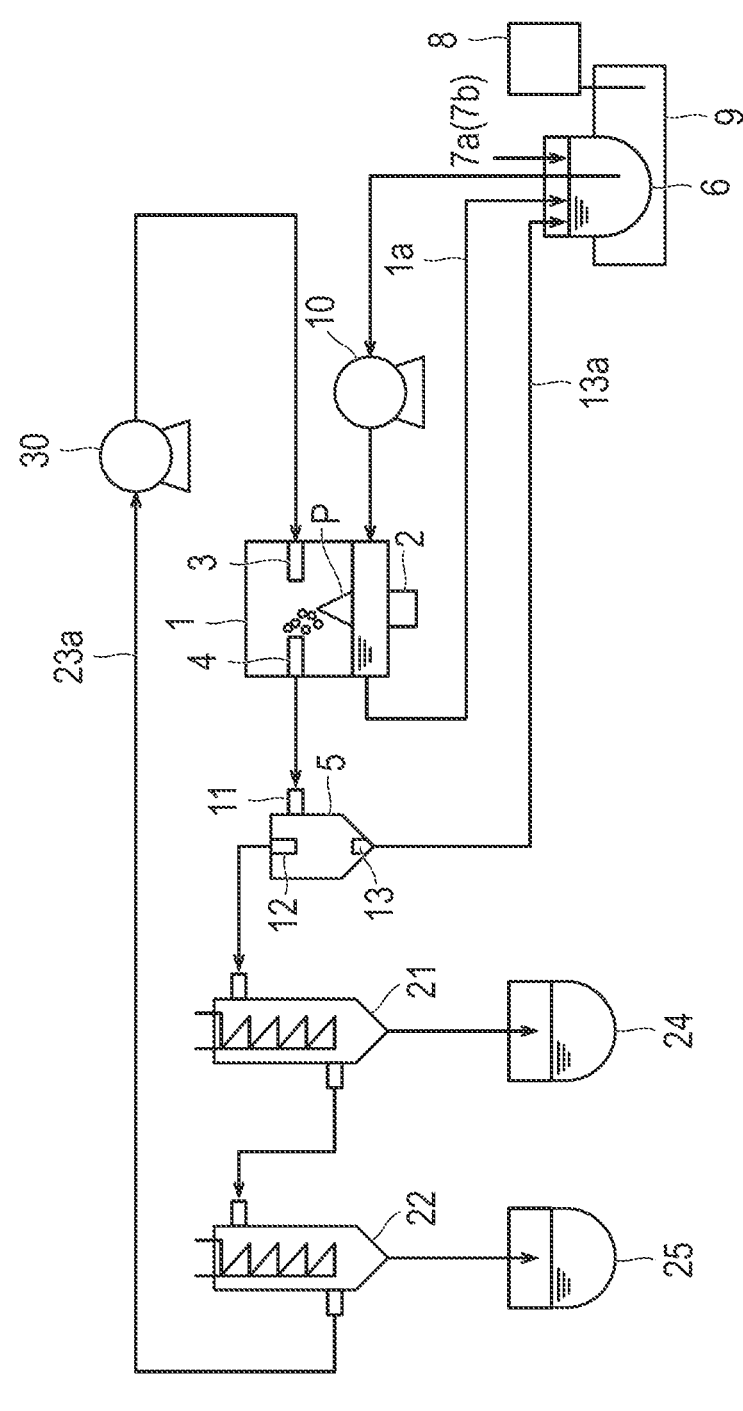
FIG. 2 is a schematic diagram illustrating another example of the ultrasonic atomization separation apparatus, in which reference numeral 1 denotes an ultrasonic atomization chamber, reference numeral 1a denotes a circulation line, reference numeral 2 denotes an ultrasonic vibrator, reference numeral 3 denotes a blowing nozzle, reference numeral 4 denotes a nozzle, reference numeral 5 denotes a cyclone, reference numeral 6 denotes a reaction liquid tank, reference numeral 7a denotes a silica sol reaction liquid, reference numeral 7b denotes water, reference numeral 8 denotes a heater, reference numeral 9 denotes a bath, reference numeral 10 denotes a pump, reference numeral 11 denotes an inlet, reference numeral 12 denotes an upper outlet, reference numeral 13 denotes a lower outlet, reference numerals 13a and 23a each denote a line, reference numeral 21 denotes a first cooling/recovery tower, reference numeral 22 denotes a second cooling/recovery tower, reference numerals 24 and 25 each denote a recovery liquid tank, reference numeral 30 denotes a gas pressurizer, reference numeral 200 denotes an ultrasonic atomization separation apparatus, and reference numeral P denotes a liquid pillar.

Note that FIG. 1 illustrates an example in which three cooling/recovery towers are disposed, and FIG. 2 illustrates an example in which two cooling/recovery towers are disposed. However, of course, the present invention is not limited thereto, and one cooling/recovery tower may be disposed, or four or more cooling/recovery towers may be disposed.

The silica sol reaction liquid is continuously supplied to the ultrasonic atomization chamber 1 from a reaction liquid tank 6 using a pump 10. In the ultrasonic atomization chamber 1, all the supplied silica sol reaction liquid is not atomized as a mist. This is because, when the liquid amount in the ultrasonic atomization chamber 1 is constant, the size of the liquid pillar P formed on a liquid surface due to ultrasonic vibration by the ultrasonic vibrator 2 is constant, and therefore this is preferable for performing atomization stably. Note that a method for supplying the silica sol reaction liquid to the ultrasonic atomization chamber 1 may be a batch method. The reaction liquid tank 6 may be heated by a bath 9 including a heater 8 as necessary.

The concentration step is a step of concentrating the silica sol reaction liquid. By performing the present step, the concentration of the silica sol can be increased, and the economic efficiency of the silica sol can be improved.

In the concentration step, the above-described ultrasonic atomization separation method is used. Specific examples thereof include a method for adding a silica sol reaction liquid 7a such that the amount of the silica sol reaction liquid in the reaction liquid tank 6 is kept at a certain level or more in the ultrasonic atomization separation apparatus (100, 200) illustrated in FIGS. 1 and 2 to perform concentration.

The water replacement step is a step of replacing the organic solvent in the silica sol with water. By performing the present step, an unreacted substance contained in the silica sol reaction liquid can also be removed, and a long-term stable water-replaced silica sol can be obtained.

In the water replacement step, the above-described ultrasonic atomization separation method is used. Specific examples thereof include a method for adding water 7b such that the amount of the silica sol reaction liquid in the reaction liquid tank 6 is kept at a certain level or more in the ultrasonic atomization separation apparatus (100, 200) illustrated in FIGS. 1 and 2 to perform water replacement.

As water used in the present step, pure water or ultrapure water is preferably used from a viewpoint of minimizing contamination with metal impurities and the like.

As described above, a silica sol can be obtained.

Physical property values of silica particles in a silica sol obtained by the manufacturing method according to an aspect of the present invention can be evaluated by, for example, an average secondary particle size, a volume-based 90% particle size ($D_{90}$), a volume-based 50% particle size ($D_{50}$), a volume-based 10% particle size ($D_{10}$), or the like.

The average secondary particle size of the silica particles is not particularly limited, but is preferably 10 nm or more and 300 nm or less. Note that a value of the average secondary particle size of the silica particles can be measured as, for example, a volume average particle size by a dynamic light scattering method.

As the volume-based 90% particle size ($D_{90}$), the volume-based 50% particle size ($D_{50}$), and the volume-based 10% particle size ($D_{10}$), for example, values of the particle size of silica particles finally integrated when the volume of the silica particles is integrated in order from silica particles having a smaller particle size by a dynamic light scattering method until 90%, 50% and 10% of the integrated volume of silica particles in a silica sol obtained by the manufacturing method according to an aspect of the present invention are reached, respectively, can be used.

The volume-based 90% particle size ($D_{90}$) of silica particles in a silica sol obtained by the manufacturing method according to an aspect of the present invention is not particularly limited, but is preferably 15 nm or more and 400 nm or less. The volume-based 10% particle size ($D_{10}$) of silica particles in a silica sol obtained by the manufacturing method according to an aspect of the present invention is not particularly limited, but is preferably 5 nm or more and 150 nm or less.

The concentration of silica particles in a silica sol obtained by the manufacturing method according to an aspect of the present invention varies depending on the particle size of obtained silica particles. However, for example, when the average secondary particle size is 10 nm or more and 300 nm or less, the concentration is preferably 0.1% by mass or more and 60% by mass or less, and more preferably 0.5% by mass or more and 40% by mass or less.

Furthermore, a silica sol obtained by the manufacturing method according to an aspect of the present invention contains an alkali catalyst. Since the alkali catalyst has an effect of dispersing silica particles, a silica sol obtained by the manufacturing method according to an aspect of the present invention can suppress or prevent aggregation of silica particles and an increase in the viscosity of the silica sol, can easily increase the concentration thereof, and can have excellent economic efficiency.

If a case where the alkali catalyst is ammonia is taken as an example, the concentration of ammonia in the silica sol is preferably 0.02% by mass or more and 0.30% by mass or less, and more preferably 0.04% by mass or more and 0.25% by mass or less. Note that the concentration of ammonia in the silica sol can be measured by a method described in Examples.

The viscosity of a silica sol obtained by the manufacturing method according to an aspect of the present invention at 25° C. is preferably as low as 1 mPa·s or more and 20 mPa·s or less. Therefore, the silica sol can easily increase the concentration thereof, and can be a silica sol having excellent economic efficiency.

Note that the viscosity of a silica sol can be measured by a method described in Examples.

The pH of a silica sol obtained by the manufacturing method according to an aspect of the present invention is preferably 8.0 or more and 13.0 or less, and more preferably 8.5 or more and 12.0 or less. The pH of a silica sol can be measured by a method described in Examples.

According to the manufacturing method according to an aspect of the present invention, the total content of metal impurities contained in a silica sol, for example, the total content of metal impurities such as Al, Ca, B, Ba, Co, Cr, Cu, Fe, Mg, Mn, Na, Ni, Pb, Sr, Ti, Zn, Zr, U, and Th can be set to 1 ppm or less.

The manufacturing method according to an aspect of the present invention may further include a step other than the step of preparing a silica sol reaction liquid, the step of concentrating the silica sol reaction liquid by an ultrasonic atomization separation method, and the step of replacing the silica sol reaction liquid with water by the ultrasonic atomization separation method.

The embodiment of the present invention has been described in detail. It is clear that this is illustrative and exemplary and not restrictive, and that the scope of the present invention should be construed by the appended claims.

The present invention includes the following aspects and forms.

1. A method for manufacturing a silica sol, including:

a step of preparing a silica sol reaction liquid by hydro-lyzing and polycondensing an alkoxysilane or a con-densate thereof using an alkali catalyst in a solvent; and at least one of a step of concentrating the silica sol reaction liquid by an ultrasonic atomization separation method and a step of replacing the silica sol reaction liquid with water by the ultrasonic atomization sepa-ration method.

2. The method for manufacturing a silica sol according to the above item 1, in which the step of preparing the silica sol reaction liquid includes, mixing a liquid (A) containing the alkali catalyst, water, and a first organic solvent with a liquid (B) containing the alkoxysilane or a condensate thereof and a second organic solvent, and a liquid (C1) containing water and having a pH of 5.0 or more and less than 8.0.

3. The method for manufacturing a silica sol according to the above item 1, in which the step of preparing the silica sol reaction liquid includes, mixing a liquid (A) containing the alkali catalyst, water, and a first organic solvent with a liquid (B) containing the alkoxysilane or a condensate thereof and a second organic solvent, and a liquid (C2) containing water and no alkali catalyst.

4. The method for manufacturing a silica sol according to any one of the above items 1 to 3, in which the alkoxysilane is tetramethoxysilane:

5. The method for manufacturing a silica sol according to any one of the above items 1 to 4, in which the alkali catalyst is at least one of ammonia and an ammonium salt.

6. The method for manufacturing a silica sol according to the above item 5, in which the alkali catalyst is ammonia.

7. The method for manufacturing a silica sol according to any one of the above items 2 to 6, in which the first and second organic solvents are methanol.

EXAMPLES

The present invention will be described in more detail by using the following Examples and Comparative Examples. However, the technical scope of the present invention is not limited only to the following Examples. Note that "%" and "part" mean "% by mass" and "part by mass", respectively, unless otherwise specified. Furthermore, in the following Examples, unless otherwise specified, an operation was performed under conditions of room temperature (20° ° C. or higher and 25° C. or lower)/relative humidity of 40% RH or more and 50% RH or less.

<Preparation of Silica Sol Reaction Liquid>

To a liquid (A) obtained by mixing 1222.7 g of methanol with 178.9 g of pure water and 23.6 g of ammonia, a liquid (B) obtained by dissolving 1014.8 g of tetramethoxysilane (TMOS) in 76.0 g of methanol and a liquid (C) of 240.6 g of pure water were dropwise added over 150 minutes while the temperature of each of the liquids was maintained at 41° ° C. to prepare a silica sol reaction liquid.

The concentration of methanol in the silica sol reaction liquid, measured by gas chromatography GC-14B manufac-tured by Shimadzu Corporation was about 90% by mass or less, and the concentration of ammonia in the silica sol reaction liquid, measured by an automated titration device COM-1700A manufactured by Hiranuma Sangyo Co., Ltd. was 0.87% by mass. Furthermore, the pH of the silica sol reaction liquid, measured using a pH meter F-72 manufac-tured by Horiba, Ltd. was 10.9.

Furthermore, the volume average particle size (Mv), the volume-based 90% particle size ($D_{90}$), and the volume-based 10% particle size ($D_{10}$) of silica particles contained in the silica sol reaction liquid were measured using UPA-UT151 manufactured by Microtrac Bell Co., Ltd. Measure-ment results are illustrated in the following Table 1.

Example 1

<Concentration Step Using Ultrasonic Atomization Separa-tion Method>

Using 2100 g of the silica sol reaction liquid obtained above, a concentration step by an ultrasonic atomization separation method was performed using the ultrasonic atomization separation apparatus illustrated in FIG. 1 under the following conditions.

Frequency of ultrasonic vibrator 2: 1.6 MHz (48 V, 0.625 A)

Carrying speed of carrier gas (air): 40 L/min

Set temperature of first cooling/recovery tower 21 and second cooling/recovery tower 22: 10° C.

Set temperature of third cooling/recovery tower 23: −20° C.

Temperature of silica sol reaction liquid during atomiza-tion separation: maintained between 35° C. and 55° C.

Each time the amount of the silica sol reaction liquid in a reaction liquid tank decreased, 2100 g of a silica sol reaction liquid separately prepared and similar to the silica sol reaction liquid described above was added such that the amount of the silica sol reaction liquid in the reaction liquid tank was kept constant. The addition of 2100 g of the silica sol reaction liquid was completed to obtain a silica sol concentrate. Using 2100 g of the obtained silica sol concen-trate, a water replacement step by an ultrasonic atomization separation method was performed using the apparatus illus-trated in FIG. 1 under conditions similar to the above-described conditions until methanol had a concentration of 1% by mass or less.

Each time the amount of the silica sol reaction liquid in the reaction liquid tank decreased, separately prepared ultra-pure water was added such that the amount of the silica sol reaction liquid in the reaction liquid tank was kept constant. The addition of 6073.2 g of ultrapure water was completed to obtain a silica sol.

For the obtained silica sol, in a similar manner to the above <Preparation of silica sol reaction liquid>, the con-centration of methanol in the silica sol, the concentration of ammonia in the silica sol, the pH of the silica sol, and Mv, $D_{90}$, and $D_{10}$ of silica particles contained in the silica sol were measured. Measurement results are illustrated in the following Table 1.

Example 2

Using 1500 g of the silica sol reaction liquid obtained in a similar manner to the above <Preparation of silica sol reaction liquid>, a water replacement step by an ultrasonic atomization separation method was performed using the ultrasonic atomization separation apparatus described in FIG. 2 under the following conditions until methanol had a concentration of 1% by mass or less.

Frequency of ultrasonic vibrator 2: 1.6 MHz (48 V, 0.625 A)

Carrying speed of carrier gas (air): 40 L/min

Set temperature of first cooling/recovery tower 21 and second cooling/recovery tower 22: −20° C.

Temperature of silica sol reaction liquid during atomization separation: maintained between 35° ° C. and 55° C.

Each time the amount of the silica sol reaction liquid in the reaction liquid tank decreased, separately prepared ultrapure water was added such that the amount of the silica sol reaction liquid in the reaction liquid tank was kept constant. The addition of 4284.3 g of ultrapure water was completed to obtain a silica sol.

For the obtained silica sol, in a similar manner to the above <Preparation of silica sol reaction liquid>, the concentration of methanol in the silica sol, the concentration of ammonia in the silica sol, the pH of the silica sol, and Mv, $D_{90}$, and $D_{10}$ of silica particles contained in the silica sol were measured. Measurement results are illustrated in the following Table 1.

Comparative Example 1

Using a silica sol reaction liquid obtained in a similar manner to the above <Preparation of silica sol reaction liquid>, concentration by heating distillation and water replacement were performed using a mantle heater until methanol had a concentration of 1% by mass or less.

Into a vessel, 500 g of the silica sol reaction liquid was put, and the vessel was heated using a mantle heater to perform heating distillation. Each time the amount of the silica sol reaction liquid decreased, 500 g of a silica sol reaction liquid separately prepared and similar to the silica sol reaction liquid described above was added such that the amount of the silica sol reaction liquid in the vessel was kept constant (concentration). The addition of 500 g of the silica sol reaction liquid was completed to obtain a silica sol concentrate.

After the silica sol concentrate was obtained, the vessel was heated again using a mantle heater. Each time the amount of the silica sol reaction liquid decreased, ultrapure water separately prepared was added such that the amount of the silica sol reaction liquid in the vessel was kept constant (water replacement). The addition of 1000 g of ultrapure water was completed to obtain a silica sol.

For the obtained silica sol, in a similar manner to the above <Preparation of silica sol reaction liquid>, the concentration of methanol in the silica sol, the concentration of ammonia in the silica sol, the pH of the silica sol, and Mv, $D_{90}$, and $D_{10}$ of silica particles contained in the silica sol were measured. Measurement results are illustrated in the following Table 1.

Comparative Example 2

Using a silica sol reaction liquid obtained in a similar manner to the above <Preparation of silica sol reaction liquid>, water replacement by heating distillation was performed using a mantle heater until methanol had a concentration of 1% by mass or less.

Into a vessel, 500 g of the silica sol reaction liquid was put, and the vessel was heated using a mantle heater. Each time the amount of the silica sol reaction liquid decreased, separately prepared ultrapure water was added such that the amount of the silica sol reaction liquid in the vessel was kept constant. The addition of 1484 g of ultrapure water was completed to obtain a silica sol.

For the obtained silica sol, in a similar manner to the above <Preparation of silica sol reaction liquid>, the concentration of methanol in the silica sol, the concentration of ammonia in the silica sol, the pH of the silica sol, and Mv, $D_{90}$, and $D_{10}$ of silica particles contained in the silica sol were measured.

Furthermore, the viscosity of the silica sol was measured by the following method.

<Measurement of Viscosity of Silica Sol>

A viscometer Cannon-Fenske No. 100 (viscometer constant 0.015), a viscometer Cannon-Fenske No. 200 (viscometer constant 0.1), and a viscometer Cannon-Fenske No. 300 (viscometer constant 0.25), manufactured by Shibata Scientific Technology Ltd. are sufficiently dried in an air bath at 100° C., and then the temperature thereof was returned to room temperature. Note that No. 100 was used for silica sols of Examples 1 and 2, No. 300 was used for a silica sol of Comparative Example 1, and No. 200 was used for a silica sol of Comparative Example 2.

The Cannon-Fenske having a temperature returned to room temperature was turned upside down, and a sample was filled into the apparatus. A water bath at 25° C. was prepared, and then the Cannon-Fenske was immersed sufficiently in the water bath such that the liquid temperature was the same temperature. Thereafter, in order to measure outflow time, the Cannon Fenske was returned to its original position, and movement time between the timing marks on the apparatus was measured with a stopwatch. Furthermore, separately, the density of the sample was measured using a portable density/specific gravity/densitometer manufactured by Anton Paar. From the obtained values, the viscosity was calculated by the following formula.

$$\text{Kinematic viscosity } (\text{mm}^2/\text{s}) = \qquad \text{[Numerical formula 1]}$$
$$\text{viscometer constant} \times \text{outflow time (sec)}$$

$$\text{Viscosity (mPa} \cdot \text{s)} = \text{kinematic viscosity } (\text{mm}^2/\text{s}) \times \text{density } (\text{g/cm}^3)$$

Measurement results are illustrated in the following Table 1.

TABLE 1

| | pH | Methanol concentration (% by mass) | Ammonia concentration (% by mass) | Silica particles Mv (nm) | $D_{90}$ (nm) | $D_{10}$ (nm) | Viscosity (mPa · s) |
|---|---|---|---|---|---|---|---|
| Silica sol reaction liquid | 10.9 | About 90 | 0.87 | 56.5 | 76.7 | 38.7 | — |
| Example 1 | 9.6 | 1 or less | 0.12 | 55.0 | 77.8 | 35.9 | 7 |
| Example 2 | 9.6 | 1 or less | 0.05 | 57.0 | 78.0 | 38.5 | 4 |
| Comparative Example 1 | 7.1 | Not detected | Not detected | 57.1 | 76.1 | 39.3 | 103 |
| Comparative Example 2 | 7.3 | Not detected | Not detected | 57.4 | 77.1 | 40.5 | 43 |

As is clear from Table 1, it has been found that ammonia as an alkali catalyst remains in the silica sols obtained in Examples 1 and 2. Furthermore, it has been found that the silica sols obtained in Examples 1 and 2 have a low viscosity, can easily increase the concentration thereof, and can improve the economic efficiency thereof.

On the other hand, it has been found that the silica sols obtained in Comparative Examples 1 and 2 have no ammonia remaining therein, have a high viscosity, and can hardly increase the concentration thereof.

What is claimed is:

1. A method for manufacturing a silica sol, the method comprising:

preparing a silica sol reaction liquid by hydrolyzing and polycondensing an alkoxysilane or a condensate thereof using an alkali catalyst in a solvent; and at least one of:

concentrating the silica sol reaction liquid by an ultrasonic atomization separation method; or replacing the silica sol reaction liquid with water by the ultrasonic atomization separation method, wherein the ultrasonic atomization separation method comprises:

continuously supplying the silica sol reaction liquid to an ultrasonic atomization chamber from a reaction liquid tank, irradiating the silica sol reaction liquid is with ultrasonic waves upward from a bottom of the ultrasonic atomization chamber toward a liquid surface of the silica sol reaction liquid to generate a mist from the liquid surface of the silica sol reaction liquid;

introducing a carrier gas into the ultrasonic atomization chamber to transfer the mist of the silica sol reaction liquid atomized in the ultrasonic atomization chamber into a separator, wherein the separator is a cyclone; and subjecting the mist to centrifugal force in the cyclone, wherein the mist is separated based on the mass of the mist, and wherein mist having a large particle size comprising water and a very small amount of silica particles moves to an inner surface of the cyclone and is discharged from a lower outlet and supplied to a reaction tank, and mist comprising the solvent and the alkali catalyst discharges from an upper outlet.

2. The method for manufacturing a silica sol according to claim 1, wherein the silica sol reaction liquid or water is added to the reaction liquid tank such that the amount of the silica sol reaction liquid in the reaction liquid tank is kept constant.

3. The method for manufacturing a silica sol according to claim 1, wherein a liquid amount in the ultrasonic atomization chamber is constant.

4. The method for manufacturing a silica sol according to claim 1, wherein preparing the silica sol reaction liquid comprises:

mixing a liquid (A) comprising the alkali catalyst, water, and a first organic solvent with:

a liquid (B) comprising the alkoxysilane or a condensate thereof and a second organic solvent; and a liquid (C1) comprising water and having a pH of 5.0 or more and less than 8.0.

5. The method for manufacturing a silica sol according to claim 1, wherein preparing the silica sol reaction liquid comprises:

mixing a liquid (A) comprising the alkali catalyst, water, and a first organic solvent with:

a liquid (B) comprising the alkoxysilane or a condensate thereof and a second organic solvent; and a liquid (C2) comprising water and no alkali catalyst.

6. The method for manufacturing a silica sol according to claim 1, wherein the alkoxysilane is tetramethoxysilane.

7. The method for manufacturing a silica sol according to claim 1, wherein the alkali catalyst is at least one of ammonia and an ammonium salt.

8. The method for manufacturing a silica sol according to claim 7, wherein the alkali catalyst is ammonia.

9. The method for manufacturing a silica sol according to claim 4, wherein the first and second organic solvents are methanol.

10. The method for manufacturing a silica sol according to claim 5, wherein the first and second organic solvents are methanol.

11. The method for manufacturing a silica sol according to claim 1, wherein the ultrasonic waves have a frequency of 1.0 MHz or more and 10.0 MHz or less.

12. The method for manufacturing a silica sol according to claim 1, wherein the mist is generated by generating a liquid pillar formed on the liquid surface of the silica sol reaction liquid due to the ultrasonic waves irradiating the silica sol reaction liquid.

* * * * *